US008943845B2

(12) United States Patent
Lafleur et al.

(10) Patent No.: US 8,943,845 B2
(45) Date of Patent: Feb. 3, 2015

(54) WINDOW AIR CONDITIONER DEMAND SUPPLY MANAGEMENT RESPONSE

(75) Inventors: Robert Lafleur, Louisville, KY (US); John K. Besore, Prospect, KY (US); Natarajan Venkatakrishnan, Louisville, KY (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 12/834,440

(22) Filed: Jul. 12, 2010

(65) Prior Publication Data
US 2012/0006525 A1 Jan. 12, 2012

(51) Int. Cl.
G05D 23/32 (2006.01)
G05D 23/19 (2006.01)
F24F 11/00 (2006.01)
F24F 1/02 (2011.01)

(52) U.S. Cl.
CPC .......... G05D 23/1902 (2013.01); F24F 11/006 (2013.01); *F24F 1/027* (2013.01); *F24F 2011/0064* (2013.01); *F24F 2011/0075* (2013.01)
USPC ................ 62/157; 62/231; 236/1 C; 700/276; 340/870.16; 340/870.17

(58) Field of Classification Search
USPC .................................................. 62/157, 231
See application file for complete search history.

(56) References Cited

U.S. PATENT DOCUMENTS

| | | | |
|---|---|---|---|
| 2,545,054 A | 3/1951 | Stitz | |
| 3,683,343 A | 8/1972 | Feldman et al. | |
| 3,720,073 A | 3/1973 | McCarty | |
| 4,048,812 A | 9/1977 | Thomason | |
| 4,167,786 A | 9/1979 | Miller et al. | |

(Continued)

FOREIGN PATENT DOCUMENTS

| | | |
|---|---|---|
| CN | 1692317 A | 11/2005 |
| CN | 101013979 A | 8/2007 |

(Continued)

OTHER PUBLICATIONS

International Search Report from PCT Application No. PCT/US2009/056878, Nov. 17, 2009.

(Continued)

*Primary Examiner* — Cheryl J Tyler
*Assistant Examiner* — Orlando E Aviles Bosques
(74) *Attorney, Agent, or Firm* — GE Global Patent Operation; Marc A. Vivenzio

(57) ABSTRACT

An appliance for conditioning air of an associated room and an associated method for controlling an air conditioner are disclosed, the controller selectively adjusting operation of the air conditioning appliance based on historical operating data. The controller adjusts a set-point of the appliance for a preselected period of time in response to the historical operating data of the appliance when the appliance operates in an energy savings mode. The controller is configured to receive and process data relating to the rate of change in the temperature. Further, an override feature may be included to maintain operation of the appliance in a normal operation mode if ambient temperature reaches a predetermined threshold value. Another feature is that the controller determines whether the compressor has been operational less than a preselected period of time and, if so, the compressor is operated until such time period has elapsed.

16 Claims, 6 Drawing Sheets

(56) References Cited

U.S. PATENT DOCUMENTS

| | | |
|---|---|---|
| 4,190,756 A | 2/1980 | Foerstner |
| 4,216,658 A | 8/1980 | Baker et al. |
| 4,247,786 A | 1/1981 | Hedges |
| 4,362,970 A | 12/1982 | Grady |
| 4,454,509 A | 6/1984 | Buennagel et al. |
| 4,637,219 A | 1/1987 | Grose |
| 4,659,943 A | 4/1987 | Virant |
| 4,718,403 A | 1/1988 | McCall |
| 4,731,547 A | 3/1988 | Alenduff et al. |
| 4,841,281 A | 6/1989 | Melvin, Jr. |
| 4,903,502 A * | 2/1990 | Hanson et al. ................... 62/157 |
| 4,926,837 A | 5/1990 | Parker et al. |
| 4,998,024 A | 3/1991 | Kirk et al. |
| 5,040,724 A | 8/1991 | Brinkruff et al. |
| 5,137,041 A | 8/1992 | Hall et al. |
| 5,183,998 A | 2/1993 | Hoffman et al. |
| 5,220,807 A | 6/1993 | Bourne et al. |
| 5,224,355 A | 7/1993 | So et al. |
| 5,230,467 A | 7/1993 | Kubsch et al. |
| 5,289,362 A | 2/1994 | Liebl et al. |
| 5,408,578 A | 4/1995 | Bolivar |
| 5,430,430 A | 7/1995 | Gilbert |
| 5,451,843 A | 9/1995 | Kahn et al. |
| 5,462,225 A * | 10/1995 | Massara et al. ................. 236/47 |
| 5,479,157 A | 12/1995 | Suman et al. |
| 5,479,558 A | 12/1995 | White et al. |
| 5,481,140 A | 1/1996 | Maruyama et al. |
| 5,488,565 A | 1/1996 | Kennon et al. |
| 5,495,551 A | 2/1996 | Robinson et al. |
| 5,504,306 A | 4/1996 | Russell et al. |
| 5,505,377 A * | 4/1996 | Weiss .............................. 236/47 |
| 5,515,692 A | 5/1996 | Sterber et al. |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,761,083 A | 6/1998 | Brown et al. |
| 5,805,856 A | 9/1998 | Hanson |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,886,647 A | 3/1999 | Badger et al. |
| 5,926,776 A | 7/1999 | Glorioso et al. |
| 5,937,942 A | 8/1999 | Bias et al. |
| 5,956,462 A | 9/1999 | Langford |
| 6,018,150 A | 1/2000 | Maher |
| 6,026,651 A | 2/2000 | Sandelman |
| 6,080,971 A | 6/2000 | Seitz |
| 6,118,099 A | 9/2000 | Lake |
| 6,144,161 A | 11/2000 | Kimmich et al. |
| 6,179,213 B1 | 1/2001 | Gibino et al. |
| 6,185,483 B1 | 2/2001 | Drees |
| 6,229,433 B1 | 5/2001 | Rye et al. |
| 6,246,831 B1 | 6/2001 | Seitz et al. |
| 6,380,866 B1 | 4/2002 | Sizer et al. |
| 6,400,103 B1 | 6/2002 | Adamson |
| 6,480,753 B1 | 11/2002 | Calder et al. |
| 6,489,597 B1 | 12/2002 | Hornung |
| 6,553,595 B1 | 4/2003 | Bruntz et al. |
| 6,631,622 B1 | 10/2003 | Ghent et al. |
| 6,694,753 B1 | 2/2004 | Lanz et al. |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,860,431 B2 | 3/2005 | Jayadev |
| 6,872,919 B2 | 3/2005 | Wakefield et al. |
| 6,873,876 B1 | 3/2005 | Aisa |
| 6,879,059 B2 | 4/2005 | Sleva |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 | 11/2005 | Horst |
| 6,983,210 B2 | 1/2006 | Matsubayashi et al. |
| 7,010,363 B2 | 3/2006 | Donnelly et al. |
| 7,039,575 B2 | 5/2006 | Juneau |
| 7,043,380 B2 | 5/2006 | Rodenberg et al. |
| 7,053,790 B2 | 5/2006 | Jang et al. |
| 7,057,140 B2 | 6/2006 | Pittman |
| 7,069,090 B2 | 6/2006 | Huffington et al. |
| 7,082,380 B2 * | 7/2006 | Wiebe et al. ................... 702/182 |
| 7,110,832 B2 | 9/2006 | Ghent |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,541,941 B2 | 6/2009 | Bogolea et al. |
| 7,561,977 B2 | 7/2009 | Horst et al. |
| 7,565,813 B2 | 7/2009 | Pouchak |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,185,252 B2 | 5/2012 | Besore |
| 8,190,302 B2 | 5/2012 | Burt et al. |
| 8,355,748 B2 | 1/2013 | Abe et al. |
| 8,367,984 B2 | 2/2013 | Besore et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0071689 A1 | 6/2002 | Miyamoto |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 | 12/2003 | Horst et al. |
| 2004/0024483 A1 | 2/2004 | Holcombe |
| 2004/0034484 A1 | 2/2004 | Solomita et al. |
| 2004/0098171 A1 | 5/2004 | Horst |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 * | 12/2004 | Donnelly et al. ................ 700/22 |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |

(56) References Cited

U.S. PATENT DOCUMENTS

| | | |
|---|---|---|
| 2006/0123807 A1 | 6/2006 | Sullivan et al. |
| 2006/0159043 A1 | 7/2006 | Delp et al. |
| 2006/0162973 A1 | 7/2006 | Harris et al. |
| 2006/0190139 A1 | 8/2006 | Reaume et al. |
| 2006/0208570 A1 | 9/2006 | Christian et al. |
| 2006/0259547 A1 | 11/2006 | Bogatin et al. |
| 2006/0272830 A1 | 12/2006 | Fima et al. |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0008076 A1 | 1/2007 | Rodgers et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1 | 7/2008 | Kates |
| 2008/0204240 A1 | 8/2008 | Hilgers et al. |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1* | 11/2008 | Mueller et al. ............ 236/46 A |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1 | 7/2009 | Harrod et al. |
| 2009/0235675 A1* | 9/2009 | Chang et al. .................. 62/77 |
| 2009/0240381 A1 | 9/2009 | Lane |
| 2009/0254396 A1 | 10/2009 | Metcalfe |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1 | 6/2011 | Drake et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | WO 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056911, Mar. 10, 2010.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Lemay et al., An Integrated Architecture for Demand Response Communications and Control, University of Illinois Urbana-Champaign, Oct. 28, 2008.
Real-Time Feedback, Natural Resources Canada via website www.nrcan.gc.ca , 2008, http://oee.nrcan.gc.ca/publications/equipment/10918.
PCT/US2009/056882 (filed Sep. 15, 2009), International Search Report and Written Opinion.
Search Report from CN Application No. 201010135268.8 dated Oct. 24, 2012.
Weisstein, Eric W. "At Least One.", From MathWorld—A Wolfram Web Resource. http://mathworld.wolfram.com/AtLeastOne.html, p. 1.

* cited by examiner

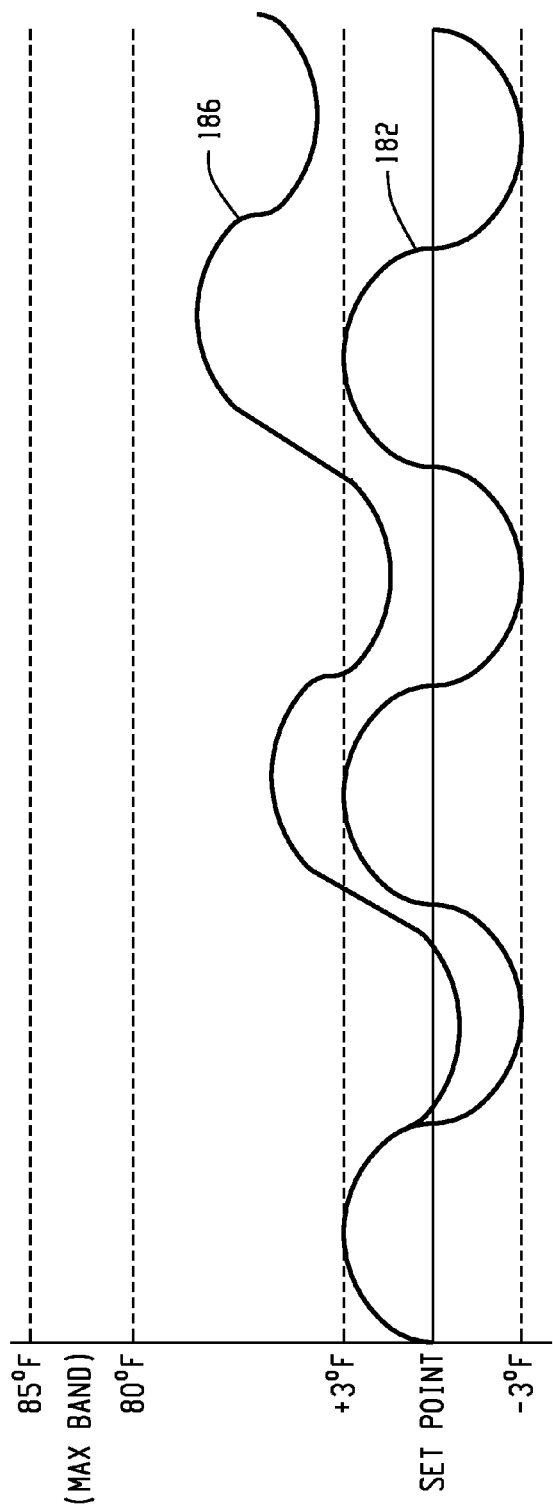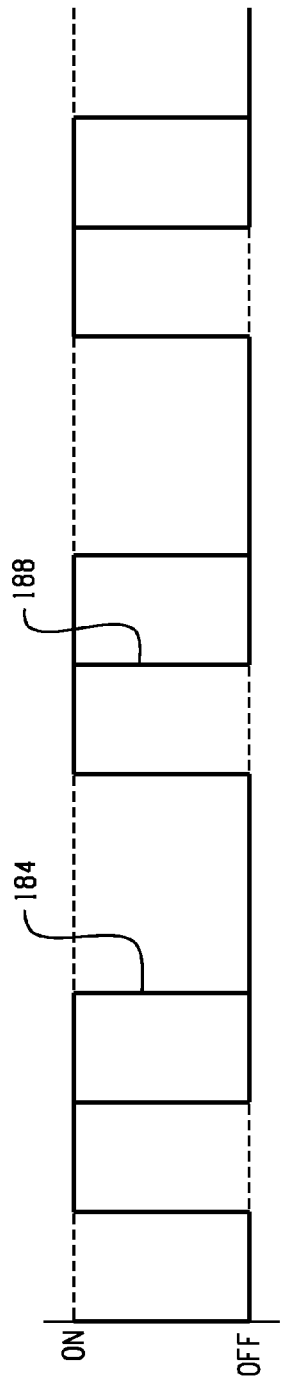

WINDOW AIR CONDITIONER DEMAND SUPPLY MANAGEMENT RESPONSE

CROSS-REFERENCE TO RELATED APPLICATIONS

This application relates to commonly-owned U.S. patent application Ser. No. 12/559,539, filed 15 Sep. 2009, the disclosure of which is expressly incorporated herein by reference in its entirety.

BACKGROUND OF THE DISCLOSURE

The present disclosure generally relates to energy management, and more particularly to energy management or demand supply management (DSM) of household consumer appliances. The disclosure finds particular application to modifying or incorporating energy saving features and functions into appliances, and specifically in a window air conditioner.

Generally, utilities charge a flat rate but as fuel prices increase and there is associated high energy usage during select parts of the day, utilities have become more sophisticated with regard to variable rates relating to the energy supplied to customers. As expected, customers or homeowners may be charged a higher rate during peak demand when energy use is high, and a lower rate when demand for energy is reduced. As will be appreciated, operating a particular home appliance during the different rate periods can result in a substantial difference in energy costs to the homeowner.

A basic solution is to have automated responses or operating parameters for particular household appliance in response to the different rates that a utility may charge. For example, during a peak period, rates may be classified as either "critical" or "high" and operation of the appliance may be terminated. On the other hand, where the energy rates are medium or low, operation of the appliance may proceed without alteration.

A need exists for a more sophisticated energy saving response, and consequently a potential energy cost savings, with regard to operation of the household appliance.

SUMMARY OF THE DISCLOSURE

An appliance for conditioning air of an associated room and an associated method for controlling an air conditioner are disclosed, the controller selectively adjusting operation of the air conditioning appliance based on historical operating data.

In an exemplary embodiment, the controller adjusts a set-point of the appliance for a preselected period of time in response to the historical operating data of the appliance when the appliance operates in an energy savings mode.

In one arrangement, the controller is configured to receive and process data regarding whether the appliance has been operating over a predetermined time period before a utility demand state signal is received, and particularly in an exemplary embodiment the predetermined time period is about one hour.

The controller is configured to receive and process data relating to similar time periods of operation, and more particularly may include receiving data from the last two consecutive days where similar time periods of those days are analyzed.

The controller may be configured to receive and process data relating to the rate of change in the temperature.

The appliance includes an override feature to maintain operation of the appliance in a normal operation mode if, for example, ambient temperature reaches a predetermined threshold value.

Another feature is that the controller determines whether the compressor has been operational less than a preselected period of time and, if so, the compressor is operated until such time period has elapsed.

A primary advantage is the ability to efficiently operate an air conditioner in response to the DSM signals and shed load as required.

Another advantage relates to the added sophistication of appliance operation associated with this design.

Still another benefit resides in the ability to operate the window air conditioner based on historical data.

Still other benefits and advantages of the present disclosure will become apparent from reading and understanding the following detailed description.

BRIEF DESCRIPTION OF THE DRAWINGS

FIG. 4 is a modified illustration of operation of an air conditioning appliance and altering the set-point.

FIG. 5 shows modification of the compressor run time for the operation schematically illustrated in FIG. 4.

DETAILED DESCRIPTION OF THE PREFERRED EMBODIMENTS

Figure 1:
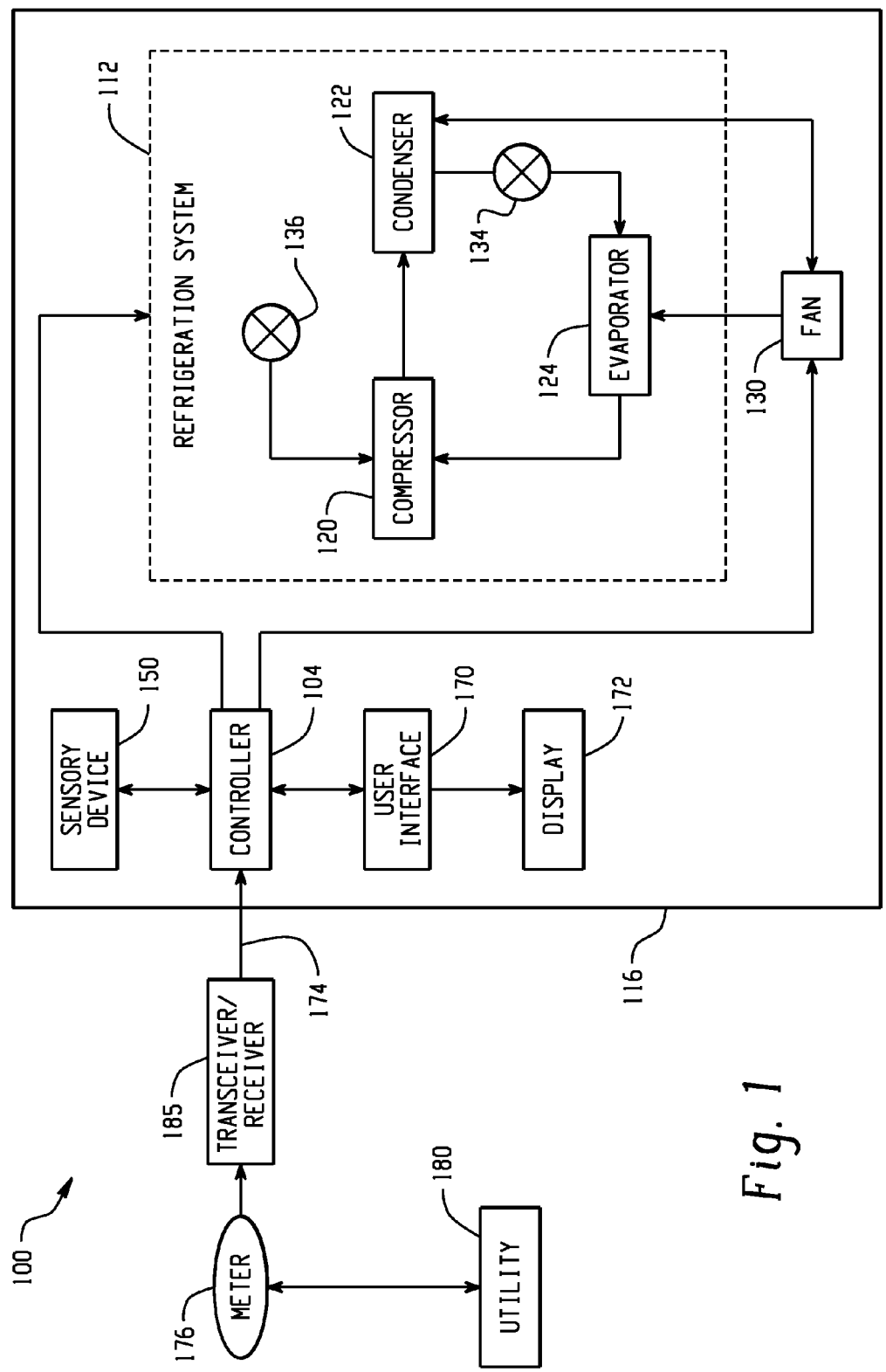
FIG. 1 is a schematic illustration of an exemplary demand managed air conditioner.

Turning to FIG. 1, an exemplary embodiment of an appliance, here a window air conditioner 100, is schematically illustrated. It will be understood that the air conditioner 100 may be a window air conditioner or similar appliance that may or may not include a heat pump cycle. A temperature controlling element is preferably a refrigeration system 112 that is encased within a housing represented as reference numeral 116 mounted within an opening in a room. The housing 116 communicates with both indoor and outdoor air. The refrigeration system 112 includes a compressor 120, condenser 122, and an evaporator 124 disposed in a refrigerant flow loop. The condenser 122 and evaporator 124 function as an indoor heat exchanger or an outdoor heat exchanger depending on the direction of flow of the refrigerant through the system 112. As is well known in the art, one of the heat exchangers functions to absorb heat and the other heat exchanger functions to dissipate heat. Fan 130 is mounted in the housing 116 for selectively drawing one of either outdoor air or indoor air to one of the condenser 122 and evaporator 124. The fan 130 includes a condenser fan that circulates outdoor air over the condenser, and likewise an evaporator fan for circulating indoor air over the evaporator.

The refrigeration system 112 is preferably a closed loop system defining passages for refrigerant fluid to flow through.

The compressor 120 imparts pressure to the refrigerant fluid, thereby increasing its temperature, and discharges refrigerant in a hot state. The condenser 122, on the other hand, comprises one or more passages or tubes that receive the hot refrigerant from the compressor 120. The evaporator 124 receives refrigerant at a lower temperature from a passage or conduit extending from the condenser. A thermostatic expansion valve 134 is located along the passage to control or meter the flow of liquid refrigerant entering the evaporator 124 at a rate the matches the amount of refrigerant being boiled off in the evaporator. The evaporator discharges refrigerant to a passage or conduit in communication with the compressor 120, while condensate from the evaporator is drained off. For a combination air conditioner and heat pump, the refrigeration system 112 is a reversible refrigerant flow type and is provided with a reversing valve 136. The reversing valve 136 is selectively operated to reverse the flow of refrigerant to the heat exchanger so as to function interchangeably as the evaporator 124 or condenser 122 heats or cools the respective air streams circulated over the heat exchanger. Air is typically drawn from within the room through a front opening inlet and circulated by a first fan or blower 130. The room air is directed past the heat exchanger through a front opening outlet. Blower 130 is driven by a motor (not shown) mounted in the housing 116. During the cooling cycle, the heat exchanger functioning as the system evaporator 124 cools and dehumidifies room air that is circulated through and for conditioning. Moisture from the air stream circulated over the heat exchanger is condensed onto the coil surfaces. Moisture is collected as condensate water and delivered to a water receptacle or sump area formed in the base portion of the housing. As is known, with an air conditioner having a heat pump cycle, the reversing valve 136 is positioned to reverse the flow of refrigerant to the indoor and outdoor heat exchangers.

A sensing or sensory device such as a thermistor 150 is often located on the housing 116. The sensing device 150 is operatively connected to the controller 104 and configured to measure the temperature of the air in the room, and a second sensor can be employed as well as to measure the outdoor air temperature. An output signal from the sensor device 150 is processed by the controller 104. In response to the sensing device signal and the set point temperature, the controller 104 selectively actuates the refrigeration system 112. In a cooling mode (if the temperature of the outdoor air is less than the set point temperature), the controller 104 can deactivate the refrigeration system and selectively draw outdoor air into the room.

A control panel often includes a user interface 170 that is in operative communication with the controller 104. The control panel oftentimes includes a display 172 and/or active areas on the display or control buttons to allow the homeowner to input selective operational parameters such as setting the set point temperature of the temperature controlling element. Further, the display 172 may illustrate various operational features of the air conditioner such as the set point, actual temperature, energy usage, energy costs, etc.

The controller 104 receives and processes a signal 174 indicative of energy rate, usage, or demand. The controller, for example, may receive a signal 174 from meter 176 that communicates with utility 180. The controller may receive signals from the meter directly and/or from transceiver/receiver 185. Alternatively, the signal 174 may be provided from another source such as a home energy manager, or any other gateway capable of delivering such a signal to the air conditioner. The controller 104 is configured to selectively adjust at least one or more power consuming features or functions to reduce power consumption of the window air conditioner 100 in the energy savings mode. Reducing total energy consumed also includes the energy consumed at peak times and/or reducing overall electricity demands, where electricity demands are defined as average watts over a short period of time on the order of five (5) minutes to several hours.

Figure 2:
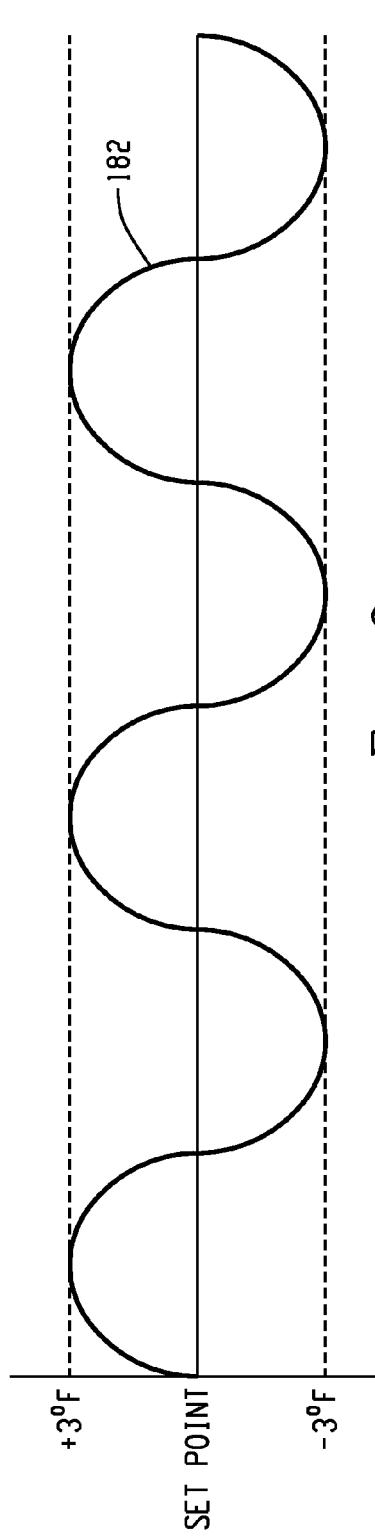
FIG. 2 is a graphical representation of operation of an air conditioning appliance, particularly a graphical representation of sensed room air temperature relative to a control set temperature.

Typically, the air conditioner 100 has a set point temperature in a normal operating mode for cooling as shown, for example, in FIG. 2. For example, if the set point is 72° F., then the room air sensor provides an input temperature signal to turn on the compressor at +3° F. and turn off the compressor at −3° F., i.e., at 75° F. and at 69° F. Thus, this signal determines the compressor run time as the air conditioner operates in the normal operating mode 182. The compressor is energized when the sensed room temperature reaches a control set point plus 3° F. (e.g., 75° F.) as measured at an indoor air sensing device 150. The compressor 120 will then shut-off (FIG. 3) as represented by square wave 184 when the sensed indoor air temperature reaches the control set point less 3° F. (i.e., in the example when the temperature reaches 69° F.). Moreover, the total bandwidth of a 6° F. response range is typically used for heating and cooling modes, although the present disclosure should not be unduly limited to the exemplary set point temperature or bandwidth. Fan speed is also user selectable in this mode.

A utility or demand response signal 174 is communicated to the controller 104. As used herein, "demand response signal" refers to a signal directly or indirectly from a utility conveying information that may cause a consumer to want to change power consumption of one or more appliances, for example, information indicating operation in a high cost period or low cost period or one or more intermediate cost periods, or a peak demand period or an off-peak demand period, or a high demand period or a low demand period or one or more intermediate demand periods. For example, one conventional signal 174 is a ZIGBEE® protocol that is transceived wirelessly. Systems will incorporate a receiver or transceiver 185 that directly receives the ZIGBEE® transmission from a meter or home energy management controller and then forward control intelligence to the appliance or other controlled device. This receiver 185 can be located external to the appliance or incorporated into the appliance control board. If located externally, it forwards the intelligence to the appliance control board through a wired connection. One typical example of such a wired connection is a CAT5 cable incorporating RJ45 connectors and linking the external ZIGBEE® module to the appliance. Of course other communication protocols can be used and the present disclosure should not be limited to any particular communication format. A demand supply management (DSM) enabled window air conditioner 100 incorporates an indoor room ambient temperature sensor 150, preferably located on the indoor coil air inlet side, and a counter with a memory on the main printed circuit board or controller 104. The counter records the run time and the unit cycles. In addition, an override button is typically provided within the Window air conditioner or within the external DSM module so that the homeowner can override the DSM modes at any time unless a lock-out is provided via a DSM signal from the utility. Moreover, an indication of operation of the DSM can be provided, for example, by illuminating a DSM LED or a portion of the graphical display to indicate when the unit is operational.

A demand response signal 174 may be received from the utility 180 or receiver module and the controller will specify how many degrees F. (° F.) to increase the set point from the set point defined by the homeowner. A user interface may be accessed by the consumer/homeowner to use or alter the set points provided by the manufacturer or utility. For example, if a "high" or "critical" status is reached, then the controller can access a look-up table and the software implement a desired change in operation of the window air conditioner (e.g., institute a percentage increase or change the temperature set point a certain amount). As illustrated in FIGS. 4 and 5, one preferred or exemplary arrangement exhibited by curve 186 increases the set point from the set point defined by the user for a specified period of time. The controller analyzes the last hour of operation to determine whether the window air conditioner appliance has been running one hundred percent (100%) of the time. If the appliance has been operational for the last hour, then the controller analyzes the temperature slope to determine if the slope is shallow, i.e., nearing stabilization to the set point, or whether the slope is steep. If the slope is shallow, the appliance executes a delta-T ($\Delta T$) or change in temperature offset request. On the other hand, if the slope is steep, which is an indication that the unit has been operating at a 100% cycle condition and not achieving the set point temperature the user selected, the window air conditioner determines a percentage load reduction from a memory or look-up table based on the steepness of the stability slope. In this manner, the controller executes a percentage load reduction program for a specified amount of time. That is, the window air conditioner is responsive to recorded historical data associated with operation of the window air conditioner. It will be appreciated that the concept of a steep/shallow slope may vary from one home to another and such a slope can be provided by a look-up table that is established by the manufacturer and/or as customized or changed by the consumer/homeowner to establish how quickly the appliance reaches a desired set point.

Figure 3:
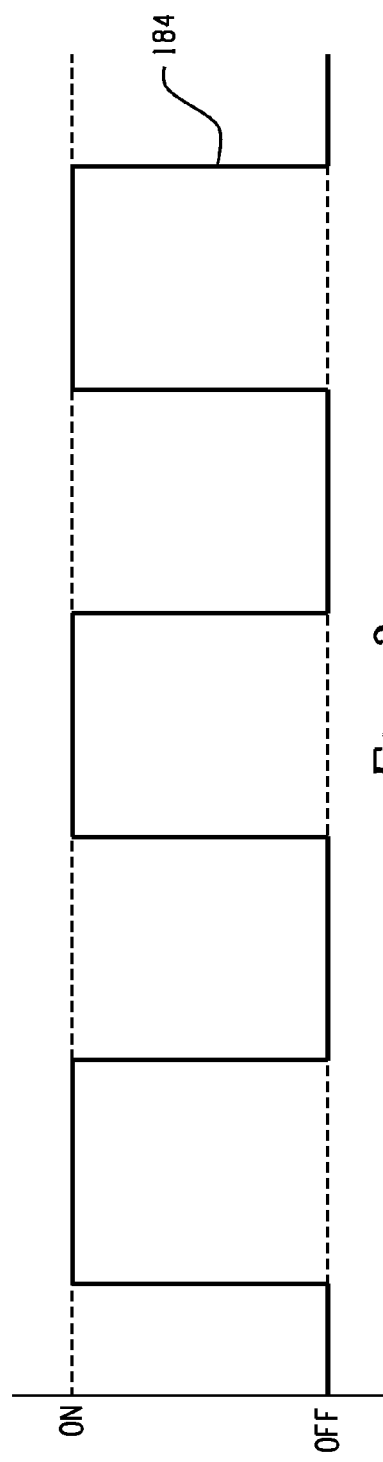
FIG. 3 is a graphical representation of the compressor run time associated with the air conditioner operation exhibited in FIG. 2.

As is evident in FIG. 5, the compressor run time represented by curve 188 is therefore reduced by some percentage, shown here as approximately one-half (½), so that the reduced load run time results in an increase in the set point temperature and a corresponding increase in the percentage load reduction. FIGS. 2 and 3 represent the response of the compressor run time to a fixed set point. That is, the state of the compressor is determined by the sensed temperature relative to the set point temperature. The on/off times of the compressor illustrated in FIG. 5 are determined by the historical analysis to achieve the desired load reduction and FIG. 4 illustrates the resulting sensed temperature pattern. When in that mode the set point temperature has not really changed, but the temperatures are allowed to be higher as if the set point temperature had changed. If the set point actually changed, except for the transient period, the correlation of the on/off times to the temperature would be as shown in FIGS. 2 and 3 except that the set point would be different. Another potential response action is to initiate a percentage load reduction and a specified length of time for the reduction. For example, run time data may be stored in a memory table and the controller analyzes the stored data from the previous two (2) hours of operation over the last twenty-four (24) hours. The data from the same time period for the last two consecutive days, for example, can also be considered. The controller can thereby determine the number of cycles per hour and the number of "on time" hours in a four (4) hour period, e.g., from 1 to 3 pm the last two days, to determine the number of cycles per hour and the number of "on time" hours in that four hour period to determine the average run time. The twenty four (24) hours of information is stored in the memory of the appliance. From this average calculation, the appliance controller adjusts an average run time by a specified percentage reduction. Preferably, the reduction is evenly spaced into the cycle providing no less than minimum three (3) minute on and three (3) minute off required run and off times that are required for proper compressor operation. That is, if the compressor has not been operated for a minimum of three minutes on, the control signal that requests that the compressor be terminated will be overlooked until the three minute time lapse has expired. Likewise, if the compressor has not been off for a consecutive period of three minutes, the controller will prevent activation of the compressor until the three minute off time limit has been exceeded. One skilled in the art will recognize that this described responsive action is exemplary only.

If only a minimum load reduction is specified, the appliance may change the fan speed to a lower fan speed and maintain current cycling pattern of the compressor if it is determined that this action alone, based on average energy consumption under the run conditions, will meet the load reduction requirement. In the energy savings mode, energy savings will continue until a specified amount of time is met at which point the appliance will assume normal function. In any demand response mode, the appliance overrides the demand response receiver module command and may restart normal operation if the indoor room temperature reaches a predetermined maximum level, e.g., 85° F. In such an instance, the window air conditioner will remain on until the room air cools to 80° F. or until the temperature reaches the prescribed lower temperature limit of the "maxband".

In still other instances, the demand supply module may signal complete unit shut down of operation or switch to a low fan speed for a specified period of time. In this stand-by mode, the appliance controller overrides the DSM command and re-starts operations if the indoor room temperature reaches 85° F. and will remain on until the room cools to 80° F. Of course, these temperatures are merely exemplary so that one skilled in the art will understand that other levels may be used without departing from the scope and intent of the present disclosure.

If the window air conditioner is enabled with meter control response (i.e., a response that is enabled by a signal received from a utility, and which utility signal typically takes precedence over any preprogrammed mode), then the meter control response may take priority over an energy management mode. When the meter control response relinquishes control, then the energy management mode takes precedence. For example, the appliance is capable of storing user defined program set point information during different periods during the day. One common program mode is to allow the homeowner to institute a seven (7) day program with four (4) different time periods during the day. The homeowner can temporarily override these programming selections by selecting a different set point (so that the program will resume in the next time period change) or can be canceled at any time. As will be appreciated, the homeowner may create seven distinct or individual programs for each day, or programs may be applied to groups of days, i.e., one group for operation on week days, and a different program selected for weekend operation.

Thus, in an order of mode priority, if the air conditioner is off, then no action is taken. Secondly in priority, if the compressor has either been "on" for a predetermined time period (e.g., less than three (3) minutes) or "off" for less than a predetermined period of time (e.g., three (3) minutes), then the compressor must continue that state until the predetermined time period (three (3) minutes) has elapsed. Thirdly in priority, if the temperature is above a predetermined temperature, e.g., 85° F., then the DSM signal may be ignored. Next, the response may be dictated by meter control, or a direct meter control response. Next in priority, the window air conditioner operates based on a defined program in the home energy manager or the seven (7) day unit programming. Finally at the lower end of the priority order the user is allowed to manually control an override for the system.

Figure 6:
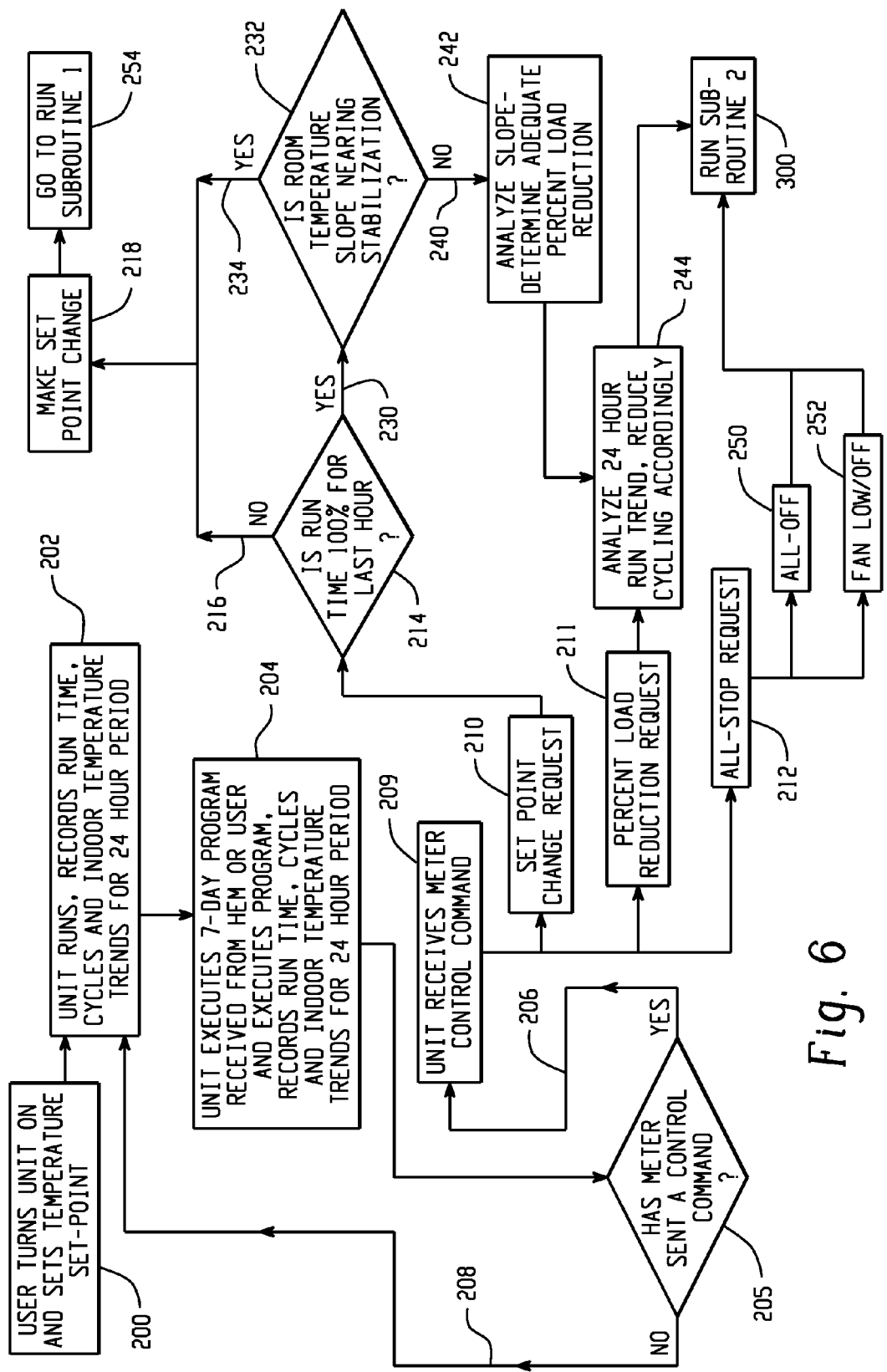
FIG. 6 is a flow chart illustrating operation of a room air conditioning unit according to the present disclosure.
Figure 7:
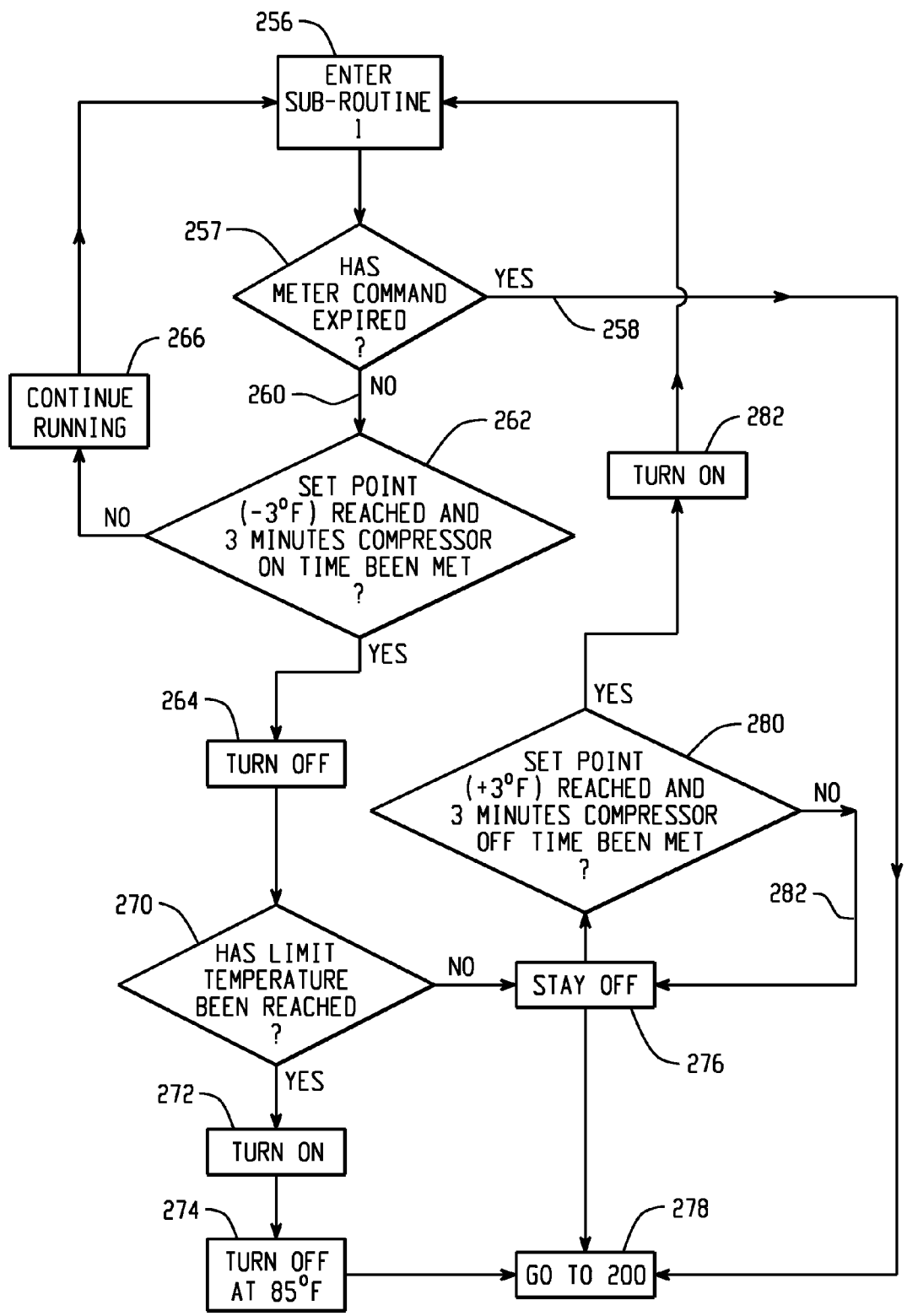
FIG. 7 is a flow chart of a first sub-routine of FIG. 6.
Figure 8:
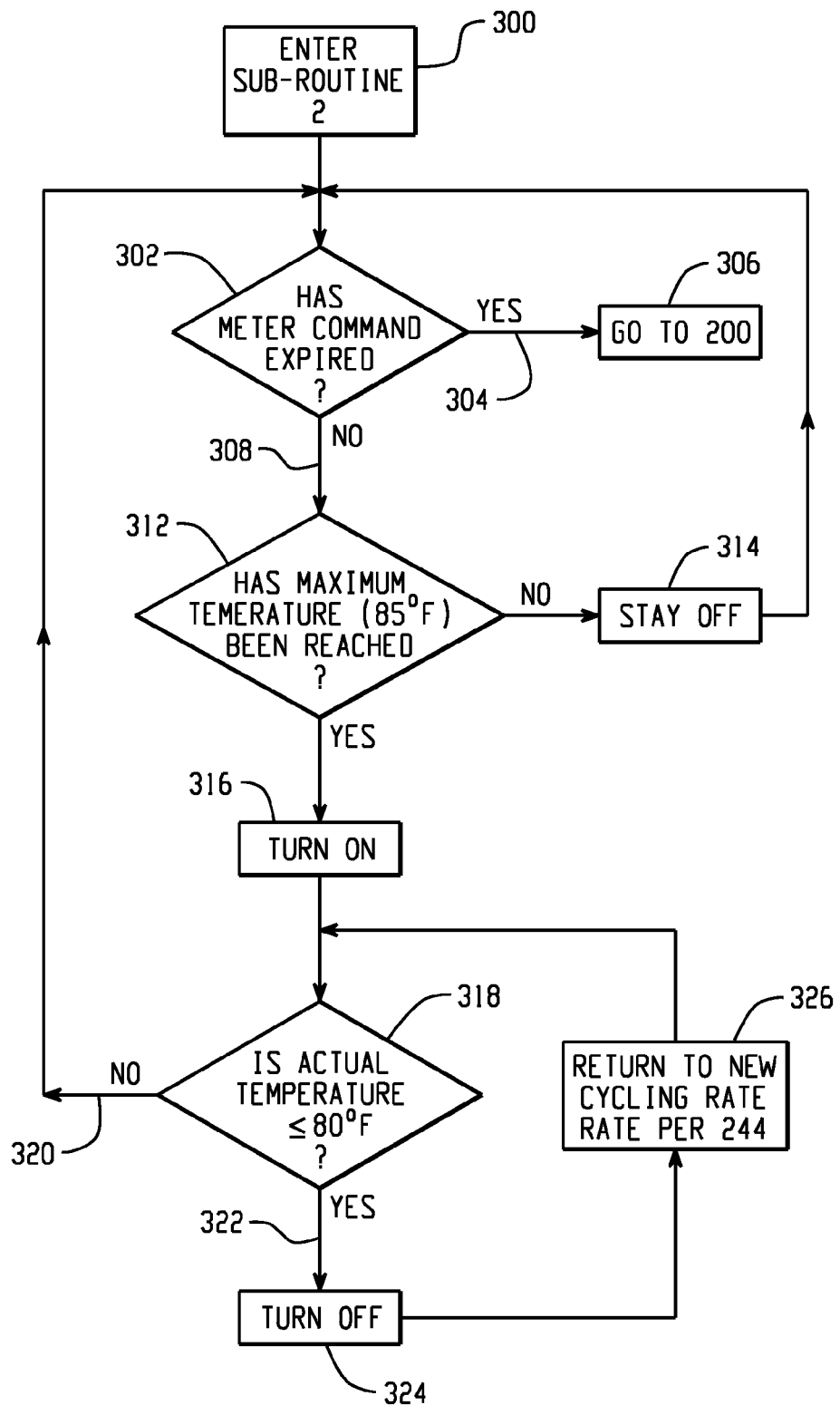
FIG. 8 is a flow chart representation of a second sub-routine of FIG. 6.

FIGS. 6-8 illustrate in flowchart form preferred operations or control of the demand supply module for a window air conditioner in accordance with one exemplary arrangement. Shown in step 200, the homeowner turns the window air conditioner appliance "on" and sets a temperature set point. As exhibited in step 202, the appliance runs and records the run time, cycles, and indoor temperature trends for a twenty-four hour period (202). The appliance may receive a seven day program from the home energy manager or from the homeowner who executes a program. Again, the controller records the run time, cycles, and indoor temperature trends for a twenty-four hour period as shown in step 204. The controller then decides at 205 whether the meter has sent a control command. If yes (206), then the unit receives the meter control command at step 209 and, if no (208), the decision returns to step 202 where the trends are recorded for a twenty-four hour period. In step 209, the window air conditioner unit receives a demand response signal representative of operation in an increased cost or demand for energy period. Three possible responses are outlined in steps 210, 211, 212, and the utility may dictate which mode is implemented. For example, the signal received from the utility may be coded and thus the signal will determine which mode is followed. In step 210, a set point change request can be initiated which leads to a decision 214 to determine whether the run time has been full or at one-hundred percent (100%) for the last hour. If the answer is no, as represented in step 216, then a set point change is made at step 218. If the answer is yes, as represented in step 230, then the controller must determine in step 232 whether the room temperature slope is nearing stabilization. If the answer is yes, as in step 234, then the set point change of step 218 is initiated. On the other hand, if the room temperature slope is not nearing stabilization as represented in step 240, then further analysis of the slope is required to determine an adequate percentage of the load reduction as indicated in step 242. This leads to analyzing a twenty-four (24) hour run trend and reducing the cycling accordingly as represented in step 244. Under a second scenario, and in response to the change in demand, the percent load reduction request 211 requires the controller to analyze the twenty-four (24) hour run trend and reduce the cycling accordingly is represented in step 244. In a third option, an "all stop" request 212 may be received at which point all operations of the window air conditioner appliance may be terminated as represented in step 250 or the fan may be turned to a low position or turned off as represented in step 252.

If the set point change is made in step 218, then a first sub-routine is run as represented in step 254 of FIG. 6 (which indicates entering the first sub-routine outlined in greater detail in FIG. 7). Thus, in step 256, the first sub-routine is entered. The first decision is to determine whether the meter command has expired (decision step 257). If yes (step 258), then the main routine is re-entered at step 202 in FIG. 6. If no (step 260), then the next decision 262 is investigated, i.e., whether the set point minus 3° F. is reached and whether the compressor has been on for a predetermined period of time (e.g., three minutes). If yes, then the compressor is turned off in step 264. If the decision step 262 determines that the set point minus a predetermined increment (e.g., 3° F.) has not been reached, or that the compressor has not been on for a minimum of three minutes, then the decision is to continue running the compressor as noted in step 266. Step 266 loops back to step 256 to continue to interrogate and determine whether or not the set point minus 3° F. has been reached or whether the compressor has been on for the minimum period of time. If the controller determines that the compressor can be turned off in step 264, the decision of 270 must still be made regarding whether the air conditioner unit has reached a maximum or limit temperature, e.g., 85° F. If the answer is yes, then the compressor remains on as represented in step 272 until such time as the room cools down to a predetermined temperature, for example 80° F. in the step 274. If, on the other hand, the temperature is below the maximum level of 85° F., then the compressor remains off as represented in step 276. In addition, the controller is determining whether or not the set point plus 3° F. has been reached and whether the three minute off time has been met in step 280. If the set point plus 3° F. has been reached and the three minute off time has been satisfied, then the compressor is turned on at step 282 and cycled toward the first decision at step 257. Alternatively, if the set point plus 3° F. has not been reached, or it has been determined that the compressor has not been off for at least three (3) minutes (step 282), then the controller 104 requires the compressor 120 to stay off in step 276 and proceed through the flow chart as described above. Upon completion of the first sub-routine of Figure while under a meter control command, the unit will then resume operation in a default mode 202 at the user's defined set point that was entered prior to the override instituted by the meter control command. One skilled in the art will also recognize that the concepts of this routine described with respect to cooling will apply to a heating scenario by suitable changes such as the associated set points (e.g., for a heating mode, the appliance may be turned on at 41° F. and turned off at 46° F.).

The output from steps 244, 250, 252 all lead to running a second sub-routine shown in FIG. 8 as identified by step 300. In this second sub-routine, the controller 104 initially determines whether the meter command expired in decision step 302. If yes (step 304), then operation of the controller is returned at step 306 to the main routine of FIG. 6 at step 200. If the answer is no (step 308), then the next decision step at 312 determines whether the maximum predetermined temperature has been reached (e.g., 85° F.). If the predetermined maximum temperature has not been reached, then the compressor remains off as indicated in step 314 and operation of the window air conditioner appliance returns to the decision step 302 to determine whether the meter command has expired. If the predetermined maximum temperature has been reached (step 316), then the controller determines at decision step 318 whether the actual temperature is less than or equal to 80° F., for example. If the decision is no (step 320), then the controller is directed to determine whether the meter command has expired in decision step 302. If the decision 318 reached is yes (step 322), then the controller is instructed to turn off the window air conditioner at step 324 and subsequently return to the new reduced cycling rate in step 326 before returning to the decision step 318 and determining if the actual temperature is less than or equal to 80° F.

The disclosure has been described with reference to the preferred embodiments. Obviously, modifications and alterations will occur to others upon reading and understanding the preceding detailed description. For example, the set point temperatures and temperature ranges are exemplary only and should not be deemed limiting. It is intended that the disclosure be construed as including all such modifications and alterations.

What is claimed is:

1. An appliance for conditioning air of an associated room, the appliance configured to receive and process data relating to a rate of change in temperature of the associated room, and the appliance is in receipt of a demand response signal representative of operation in an increased cost or demand for energy period, wherein the appliance has been operating for 100% of the time over a predetermined time period prior to processing the demand response signal, and wherein a temperature of the associated room is not nearing stabilization to a temperature set point that a user selected, the appliance comprising:

a refrigeration system comprising one or more power consuming elements for one of heating and cooling air;

a sensory device configured to measure temperature of the associated room; and a controller operatively connected to the refrigeration system, the controller being configured to:

receive and process the demand response signal, determine that the appliance has been operating for 100% of the time over the predetermined time period, receive and process the data relating to the rate of change in the temperature of the associated room, and analyze the data indicating the rate of change in temperature to determine that the temperature of the associated room is not nearing stabilization, and, in response to the determination that the temperature of the associated room is not nearing stabilization, the controller executing a percentage load reduction program based on historical operating data of the appliance, wherein the percentage load reduction program is executed to reduce the load or percent run time of at least one of the one or more power consuming elements of the refrigeration system.

2. The appliance of claim 1 wherein the predetermined time period is one hour.

3. The appliance of claim 1 wherein the controller is configured to receive and process data relating to similar time periods.

4. The appliance of claim 3 wherein the similar time periods include data from the last two consecutive days.

5. The appliance of claim 4 wherein the similar time period are representative of the same time of day.

6. The appliance of claim 1 wherein the appliance includes an override to maintain operation of the appliance in a normal operation mode.

7. The appliance of claim 6 wherein the override is automatic if ambient temperature reaches a predetermined threshold value.

8. The appliance of claim 1 wherein the controller is configured to reduce the load or percent run time of the at least one of the one or more power consuming elements for a predetermined time period in response to the demand response signal.

9. The appliance of claim 1 wherein the controller is configured to override the demand response signal if sensed temperature is above a preselected level.

10. The appliance of claim 1 wherein the controller is configured to continue with operation of a compressor if the compressor has been operational less than a preselected time period.

11. The appliance of claim 10 wherein the controller is configured to continue with operation of the compressor until the compressor has operated at least the preselected time period.

12. A control method for an air conditioner, wherein the air conditioner is configured to receive and process data relating to a rate of change in temperature of the associated room, and the air conditioner is in receipt of a demand response signal representative of operation in an increased cost or demand for energy period, wherein the air conditioner has been operating for 100% of the time over a predetermined time period prior to processing the demand response signal, and wherein a temperature of the associated room is not nearing stabilization to a temperature set point that a user selected the method comprising:

receiving and processing the demand response signal;

determining that the air conditioner has been operating for 100% of the time over the predetermined time period;

receiving and processing the data relating to the rate of change in the temperature of the associated room; and analyzing the data indicating the rate of change in temperature to determine that the temperature of the associated room is not nearing stabilization, and, in response to the determination that the temperature of the associated room is not nearing stabilization, the executing a percentage load reduction program based on historical operating data of the air conditioner, wherein the percentage load reduction program is executed to reduce the load or percent run time of at least one of the one or more power consuming elements of the refrigeration system.

13. The method of claim 12 wherein the air conditioner includes an override to maintain operation of the air conditioner in a normal operation mode.

14. The method of claim 12, further comprising reducing the load or percent run time of the at least one or more power consuming elements for a predetermined time period response to the demand response signal.

15. The method of claim 12 further comprising, overriding the demand response signal if the ambient temperature is above a preselected level.

16. The method of claim 12 further comprising, continuing with operation of the compressor until the compressor has operated at least the preselected time period.

\* \* \* \* \*